United States Patent
Liang et al.

(10) Patent No.: US 11,747,249 B2
(45) Date of Patent: Sep. 5, 2023

(54) VERTICAL HOPKINSON PRESSURE BAR TEST DEVICE AND TEST METHOD

(71) Applicant: HENAN POLYTECHNIC UNIVERSITY, Jiaozuo (CN)

(72) Inventors: Weimin Liang, Henan (CN); Jian Gong, Henan (CN); Yu Zhao, Henan (CN); Fengbin Chen, Henan (CN); Liping Wang, Henan (CN); Minmin Li, Henan (CN); Gaowei Yue, Henan (CN); Haixiao Lin, Henan (CN)

(73) Assignee: HENAN POLYTECHNIC UNIVERSITY, Henan (CN)

( * ) Notice: Subject to any disclaimer, the term of this patent is extended or adjusted under 35 U.S.C. 154(b) by 245 days.

(21) Appl. No.: 16/959,895

(22) PCT Filed: Jan. 3, 2020

(86) PCT No.: PCT/CN2020/070221
§ 371 (c)(1),
(2) Date: Apr. 8, 2021

(87) PCT Pub. No.: WO2020/186895
PCT Pub. Date: Sep. 24, 2020

(65) Prior Publication Data
US 2021/0293679 A1    Sep. 23, 2021

(30) Foreign Application Priority Data

Mar. 19, 2019 (CN) .......................... 201910205602.3

(51) Int. Cl.
*G01N 3/303* (2006.01)
*G01N 3/06* (2006.01)

(52) U.S. Cl.
CPC .............. *G01N 3/303* (2013.01); *G01N 3/066* (2013.01); *G01N 3/068* (2013.01); *G01N 2203/001* (2013.01); *G01N 2203/0098* (2013.01)

(58) Field of Classification Search
CPC ........ G01N 3/303; G01N 3/066; G01N 3/068; G01N 2203/001; G01N 2203/0098
(Continued)

(56) References Cited

FOREIGN PATENT DOCUMENTS

| CN | 204165824 U | 2/2015 |
|---|---|---|
| CN | 204789116 U * | 11/2015 |

(Continued)

OTHER PUBLICATIONS

International Search Report and Written Opinion for corresponding Application No. PCT/CN2020/070221 (dated Mar. 26, 2020).

*Primary Examiner* — Marrit Eyassu
(74) *Attorney, Agent, or Firm* — Troutman Pepper Hamilton Sanders LLP

(57) ABSTRACT

The disclosure relates to a vertical Hopkinson pressure bar test device and a test method. The device comprises a guide cylinder, an incident bar, a transmission bar, a buffer bar and a striker, and further comprises a base; side support plates arranged vertically and upwards are provided symmetrically on two sides of the base, a horizontal first lateral support plate is provided at the top between the side support plates on the two sides, three groups of horizontal second lateral support plates are provided below the first lateral support plate sequentially between the side support plates on the two sides, and each group is provided with a clamping mechanism clamping a corresponding incident bar, transmission bar or buffer bar; the surfaces of the incident bar is pasted with a first strain gauge pad and the transmission bar is pasted with a second strain gauge pad. According to the (Continued)

disclosure, the striking velocity is accurately controlled to render a medium or low velocity for analyzing the dynamic mechanical properties of low-wave impedance materials such as coal and light concrete, satisfying the requirements of dynamic tests on high, medium and low velocities.

10 Claims, 9 Drawing Sheets

(58) Field of Classification Search
USPC ............................................................ 73/781
See application file for complete search history.

(56) References Cited

FOREIGN PATENT DOCUMENTS

| | | | | |
|---|---|---|---|---|
| CN | 104374655 B | * | 8/2016 | |
| CN | 107036903 A | * | 8/2017 | ............... G01N 3/18 |
| CN | 207197937 U | | 6/2018 | |
| CN | 109813618 A | | 5/2019 | |
| CN | 209673574 U | | 11/2019 | |
| JP | 2006194595 A | * | 7/2006 | |
| JP | 2006194595 A | | 7/2006 | |

* cited by examiner

VERTICAL HOPKINSON PRESSURE BAR TEST DEVICE AND TEST METHOD

This application is a national stage application under 35 U.S.C. § 371 of PCT Application No. PCT/CN2020/070221, filed Jan. 3, 2020, which claims the priority benefit of China Patent Application No. 201910205602.3, filed Mar. 19, 2019, which are hereby incorporated by reference in their entirety.

TECHNICAL FIELD

The disclosure relates to a vertical Hopkinson pressure bar test device and a test method for testing dynamic mechanical properties of low-wave impedance materials such as coal, light concrete and frozen soil.

BACKGROUND ART

Hopkinson pressure bar technique was proposed by J. Hopkinson and B. Hopkinson in 1949, based on that, Kolsky proposed a split Hopkinson pressure bar to measure the dynamic mechanical properties of metallic materials at high strain rates. After development of more than half a century, the split Hopkinson pressure bar technique has become an important means to measure the dynamic mechanical properties of various materials. However, the existing split Hopkinson pressure bar is positioned horizontally, and performs loading mostly in a pneumatic mode, which, as a result, has some defects, including: (1) unstable strain rate of loading; (2) difficulties in analyzing the stable development and unstable propagation stages of microcracks of a material if the material is completely destroyed by too strong impact generated by high air pressure loading, when analyzing the dynamic constitutive relation of low-wave impedance materials, such as coal, light concrete and frozen soil; and (3) failure to eject a striker when the air pressure loading is low. It is unlikely to obtain accurate results due to the above defects, and therefore an improvement and innovation are necessary.

SUMMARY

In light of the above, it is an object of the disclosure to overcome the defects of the conventional art by providing a vertical Hopkinson pressure bar test device which can effectively solve the problems when testing dynamic mechanical properties of low-wave impedance materials such as coal and light concrete.

The technical solution provided by the disclosure is as follows:

a vertical Hopkinson pressure bar test device, comprises a guide cylinder, an incident bar, a transmission bar, a buffer bar and a striker, and further comprises a base, wherein side support plates arranged vertically and upwards are provided symmetrically on two sides of the base, first horizontal lateral support plate is provided at the top, between the side support plates on the two sides; three groups of horizontal second lateral support plates are provided below the first lateral support plate sequentially between the side support plates on the two sides, a mounting hole for the guide cylinder penetrating through the first lateral support plate is formed therein, an upper end of the guide cylinder is fixed with the mounting hole for the guide cylinder, the guide cylinder is of a circular tubular hollow structure connecting the top and bottom and a fixed pulley is provided above the guide cylinder; a motor is provided on the first lateral support plate; an electromagnetic clutch cooperating with the motor is provided on a rotating shaft of the motor; a wire coil is sleeved around an outer periphery of the electromagnetic clutch; one end of a steel wire rope is fixedly connected with the wire coil, the other end passes around the fixed pulley and then extends downwards into a cavity of the guide cylinder, and is fixed with an upper end of the striker in sliding connection with and along the guide cylinder; a portion of the steel wire rope extending into the cavity of the guide cylinder is collinear with a center line of the guide cylinder; an observation hole communicating the interior and exterior is provided on a side wall of a lower part of the guide cylinder; a laser velocimeter sensor for measuring a falling velocity of the striker, before striking an upper end face of the incident bar, is provided on the guide cylinder above the observation hole, and the laser velocimeter sensor is connected to a laser velocimeter used for displaying velocity measured by the laser velocimeter sensor; each group of the second lateral support plates are provided with a clamping mechanism, three groups of the clamping mechanisms of the second lateral support plates from the top to bottom correspond to the incident, transmission and buffer bars one by one, respectively; the clamping mechanism of each group clamps either the corresponding incident bar, the transmission bar or the buffer bar; moreover, the incident bar, transmission bar and buffer bar are all arranged coaxially with the guide cylinder, and a first strain gauge pad for measuring a strain value of the incident bar is pasted on a surface of the incident bar, and a second strain gauge pad for measuring a strain value of the transmission bar is pasted on a surface of the transmission bar.

A method for measuring stress-strain relationship of low-wave impedance materials based on the vertical Hopkinson pressure bar test device, comprising the steps of:

I. calibrating a) sliding the incident bar up and down along a bar channel which corresponds to the incident bar and is provided on the second lateral support plate, to make the upper end face of the incident bar to be in the range of the observation hole at the lower part of the guide cylinder and to be in contact with a lower end face of the striker; starting a first push bar motor, and pressing and fixing the incident bar;

b) sliding the transmission bar up and down along a bar channel which corresponds to the transmission bar and is provided in the second lateral support plate, to make an upper end face of the transmission bar to be tightly attached to a lower end face of the incident bar; starting a second push bar motor, and pressing and fixing the transmission bar;

c) sliding the buffer bar up and down along a bar channel which corresponds to the buffer bar and is provided in the second lateral support plate, to make an upper end face of the buffer bar to be tightly attached to a lower end face of the transmission bar; starting a third push bar motor, and pressing and fixing the buffer bar;

d) adjusting forward rotation or reverse rotation of the first push bar motor, the second push bar motor and the third push bar motor and observing a display of a dynamometer, so that a difference between a friction force generated by clamping a corresponding bar by each clamping mechanism and gravity of the corresponding bar is within ±0.5% of the corresponding bar gravity;

e) starting the electromagnetic clutch to clamp the rotating shaft of the motor tightly; starting the motor, and driving the striker to slide upwards to a specified position along the cavity of the guide cylinder by the steel wire rope;

f) releasing the electromagnetic clutch to release the rotating shaft of the motor, so that the steel wire rope loses a pulling force and the striker freely falls in the guide cylinder to strike the incident bar; acquiring a velocity V0 of the striker when contacting the incident bar by the laser velocimeter via the laser velocimeter sensor, and measuring a voltage peak Vi0 of an incident wave of the incident bar output by the first strain gauge pad attached to the incident bar, and a voltage peak Vt0 of a transmitted wave of the transmission bar output by the second strain gauge pad attached to the transmission bar, through the first strain gauge pad, the second strain gauge pad and a strain gauge; and g) amending the voltage and a strain conversion coefficient calculating voltages and strain conversion coefficients $\eta i$ and $\eta t$ of the incident bar and the transmission bar according to the following formula $$\eta = \frac{E}{V} = \frac{V_0}{2C_0}\frac{1}{V};$$

wherein V0 is the velocity of the striker when contacting the incident bar; C0 is a propagation velocity of a strain wave in a bar;

V is voltage peaks output by the resistance strain gauge pads attached to the incident bar and the transmission bar, being Vi0 and Vt0, respectively;

II. testing a) sliding the incident bar up and down along the bar channel which corresponds to the incident bar and is provided on the second lateral support plate, to make the upper end face of the incident bar to be in the range of the observation hole at the lower part of the guide cylinder and in contact with the lower end face of the striker, starting the first push bar motor, and pressing and fixing the incident bar;

b) sliding the transmission bar downwards along the bar channel, which corresponds to the transmission bar and is provided on the second lateral support plate, placing a specimen on the upper end face of the transmission bar, sliding the transmission bar upwards, to make an upper end face of the specimen to attach to the lower end face of the incident bar tightly; starting the second push bar motor, and pressing and fixing the transmission bar;

c) sliding the buffer bar up and down along the bar channel which corresponds to the buffer bar and is provided in the second lateral support plate, to make the upper end face of the buffer bar to be tightly attached to the lower end face of the transmission bar; starting the third push bar motor, and pressing and fixing the buffer bar;

d) adjusting forward rotation or reverse rotation of the first push bar motor, the second push bar motor and the third push bar motor and observing the display of the dynamometer, so that the difference between the friction force generated by clamping the corresponding bar by each clamping mechanism and the gravity of the corresponding bar is within ±0.5% of the gravity of the corresponding bar;

e) starting the electromagnetic clutch to clamp the rotating shaft of the motor tightly, starting the motor, and driving the striker to slide upwards to a specified position along the cavity of the guide cylinder by the steel wire rope;

f) releasing the electromagnetic clutch to release the rotating shaft of the motor, so that the steel wire rope loses a pulling force and the striker freely falls in the guide cylinder to strike the incident bar; acquiring a velocity V0 of the striker when contacting the incident bar by the laser velocimeter via the laser velocimeter sensor, and measuring the voltage peaks Vi, Vr and Vt output by the strain gauge pads attached to the incident bar and the transmission bar respectively through the first strain gauge pad, the second strain gauge pad and the strain gauge; wherein Vi is a voltage peak of the incident wave of the incident bar output by the first strain gauge pad, Vr is a voltage peak of a reflected wave of the incident bar output by the first strain gauge pad, and Vt is a voltage peak of a transmitted wave of the transmission bar output by the second strain gauge pad;

III. data processing converting the measured voltage peak Vi of the incident bar to an incident wave strain $\epsilon i$ according to the formula $\epsilon i=\eta i \times Vi$;

converting the measured voltage peak Vr of the transmission bar into an incident wave strain $\epsilon r$ according to the formula $\epsilon r=\eta i \times Vr$, and converting the measured Vt of the transmission bar into an incident wave strain Et according to the formula $\epsilon t=\eta t \times Vt$; and obtaining a stress-strain relationship of the specimen under the action of dynamic load according to the formula:

$$\sigma_S = EA\varepsilon_t/A_S\varepsilon = \frac{2C_0}{L_0} \times \int_0^1 \varepsilon_r d_t,$$

to understand the dynamic constitutive relation of the material.

According to the disclosure, the structure is novel, unique, simple and reasonable. Moreover, the test method is easy to implement and can accurately control the striking velocity of the striker to render a medium or low velocity of the striker for analyzing the dynamic mechanical properties of low-wave impedance materials such as coal and light concrete; the specimen is not damaged as long as the experimental space allows, and the lengths of the striker, the guide cylinder, the incident bar and the transmission bar can be correspondingly changed to meet requirements of dynamic tests at high, medium and low velocities; the striking velocity of the strikers is accurately controlled to render high, medium and low striking velocities, without pneumatic loading and electromagnetic emission, featuring reduced loss of energy and environmental protection, and having good social and economic benefits.

DETAILED DESCRIPTION OF THE EMBODIMENTS

Figure 1:
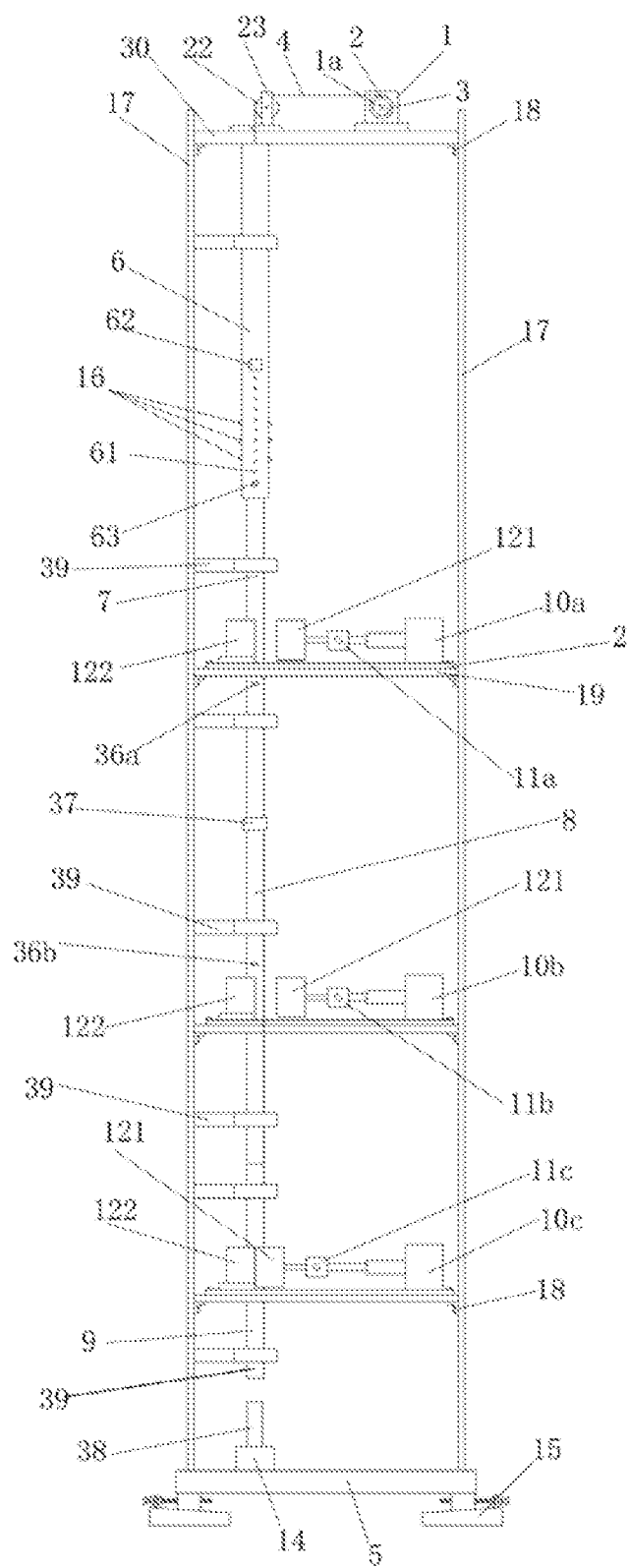
FIG. 1 is a schematic view showing a structure of the present disclosure.
Figure 2:
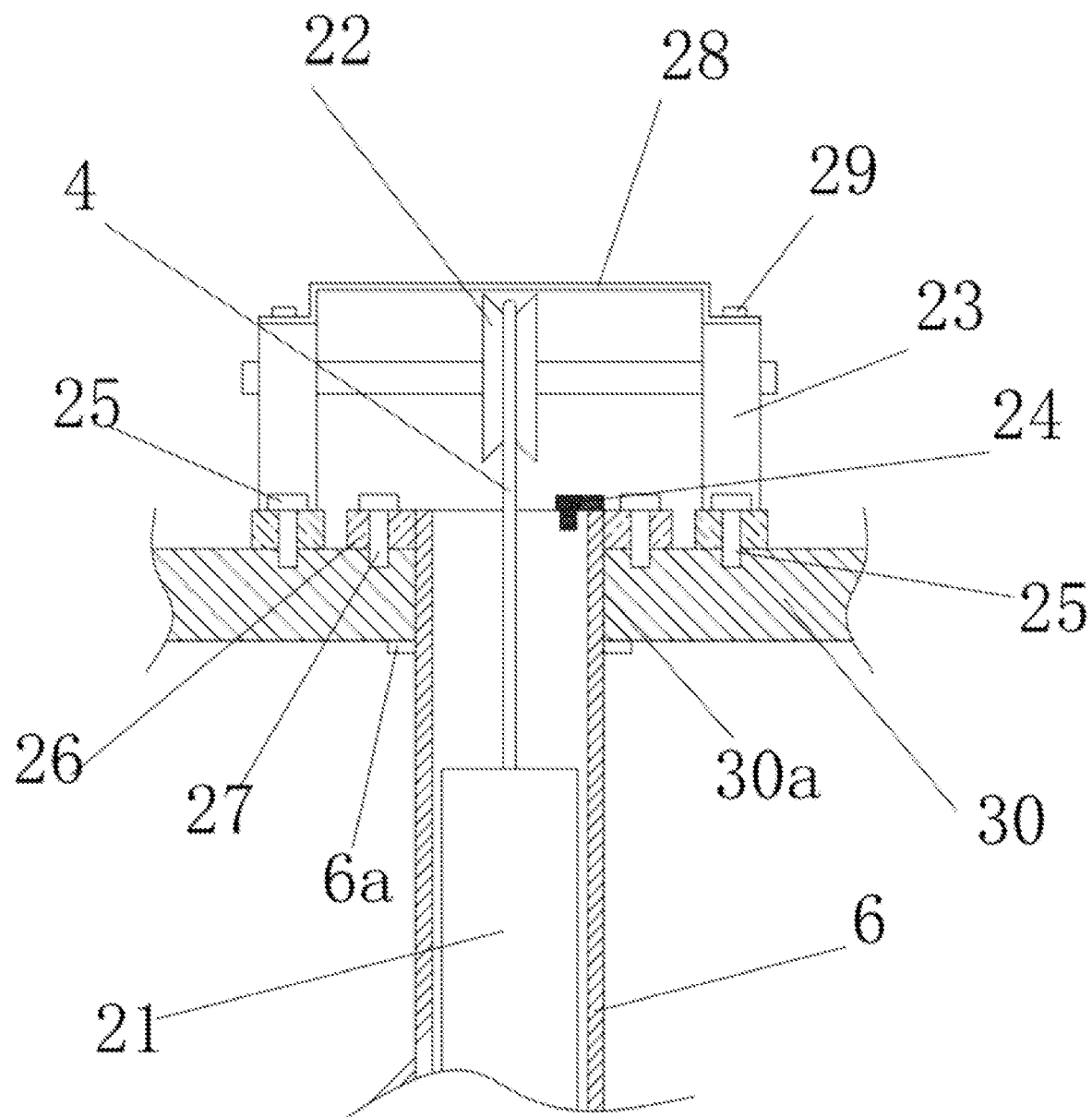
FIG. 2 is an enlarged schematic cross-sectional view of a connection of a guide cylinder with a first lateral support plate according to the present disclosure.
Figure 3:
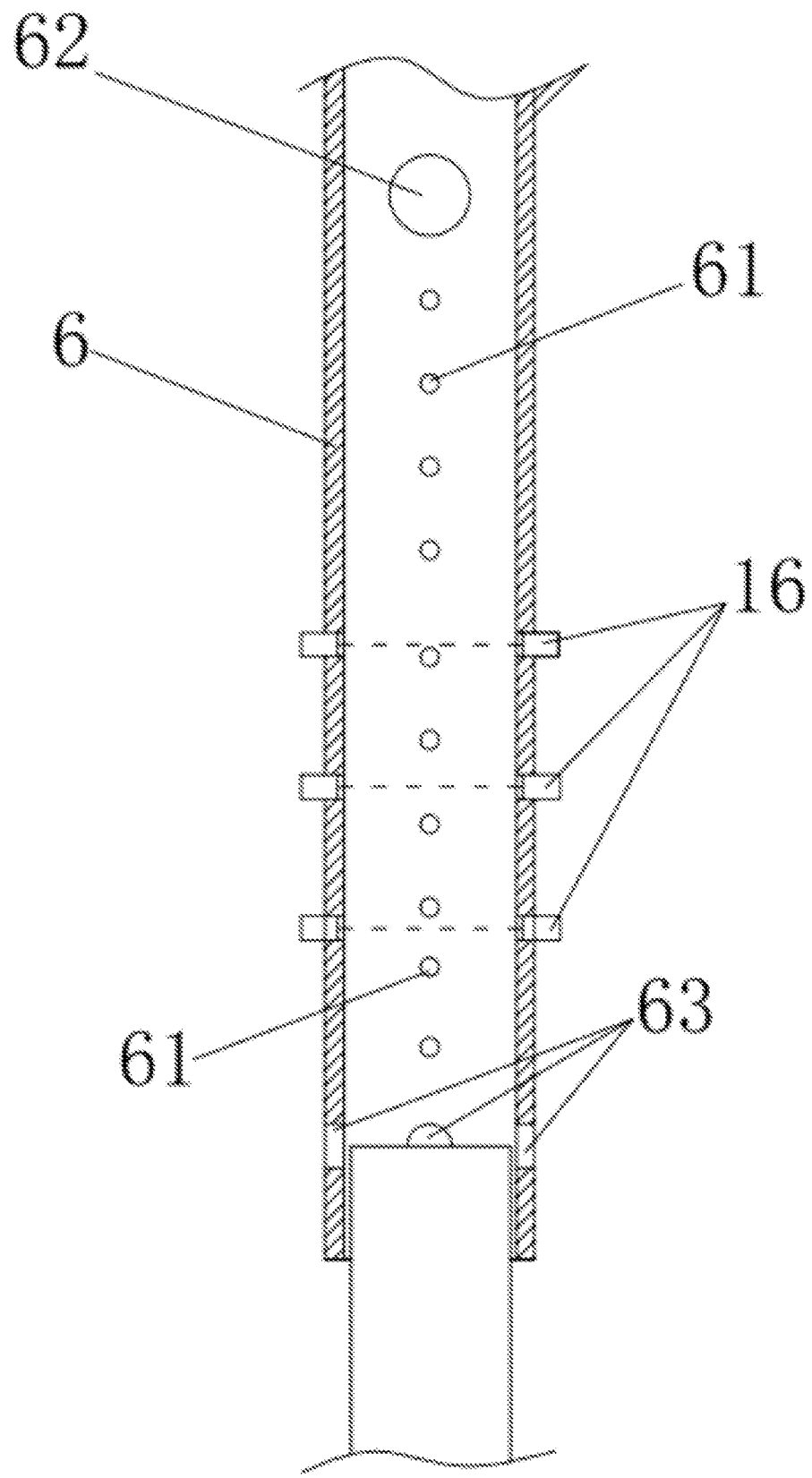
FIG. 3 is a sectional view of a lower portion of the guide cylinder according to the present disclosure.
Figure 4:
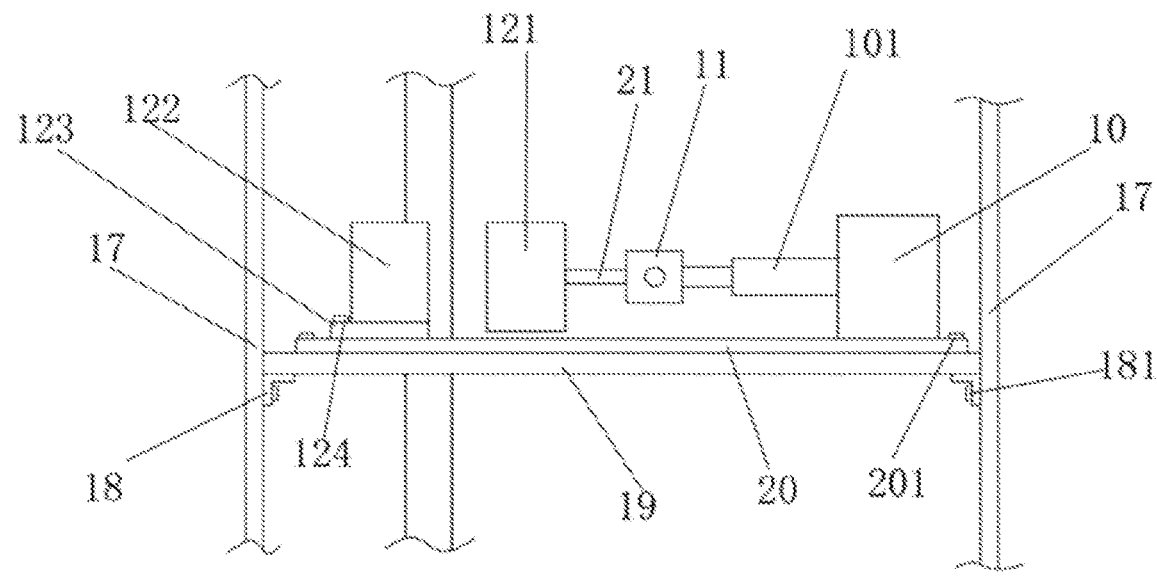
FIG. 4 is a front view of a clamping mechanism according to the present disclosure.
Figure 5:
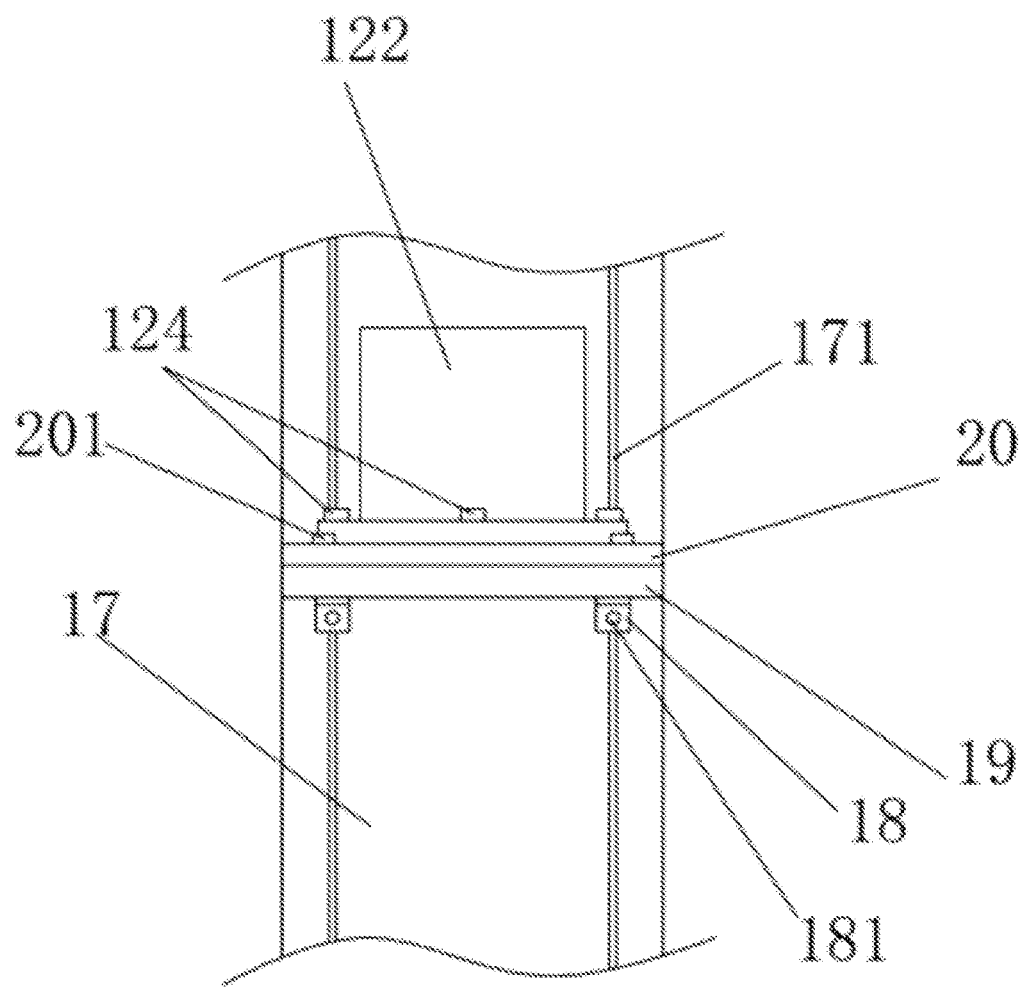
FIG. 5 is a side view of the clamping mechanism according to the present disclosure.
Figure 6:
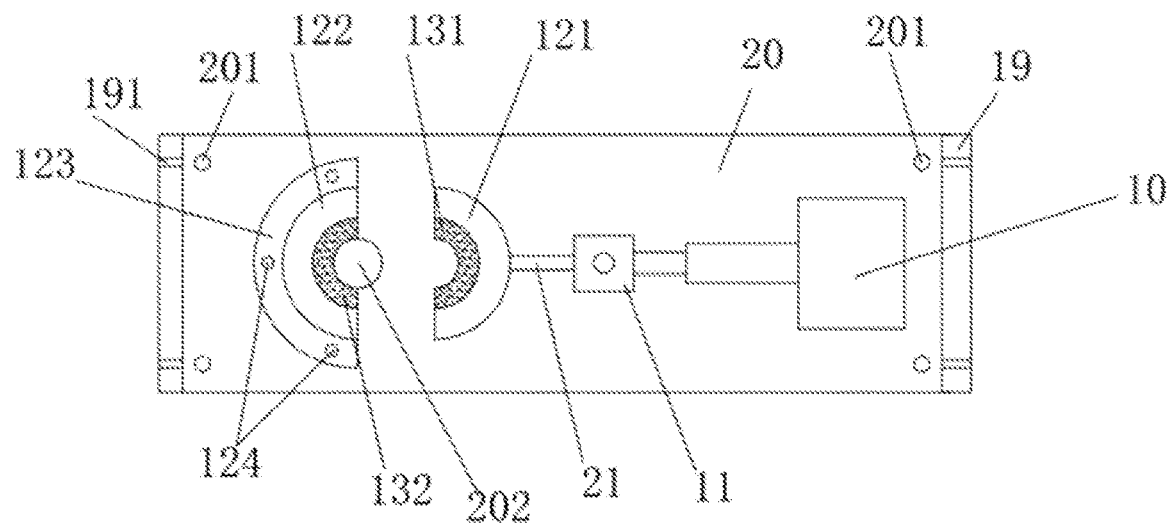
FIG. 6 is a top view of the clamping mechanism according to the present disclosure
Figure 7:
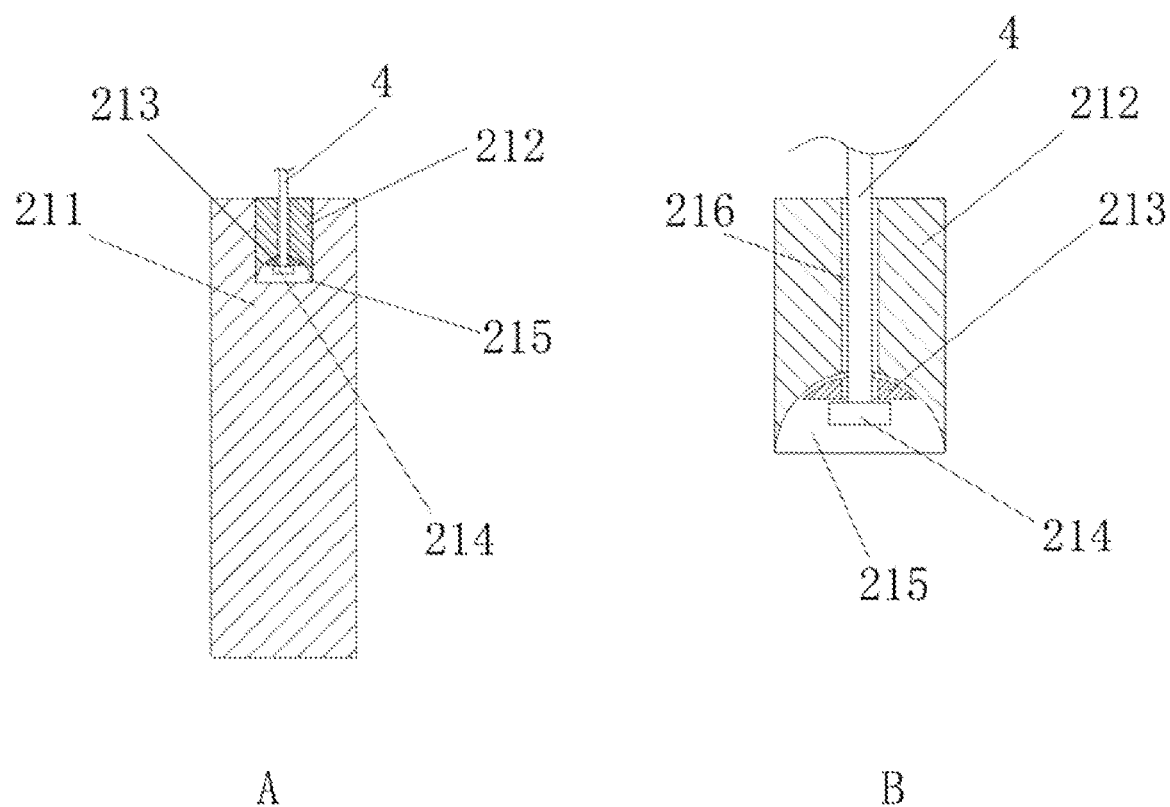
FIG. 7 is a schematic view showing a structure of the striker according to the present disclosure, wherein A is a sectional view showing a striker body assembled with a joint; B is a sectional view of the joint.
Figure 8:
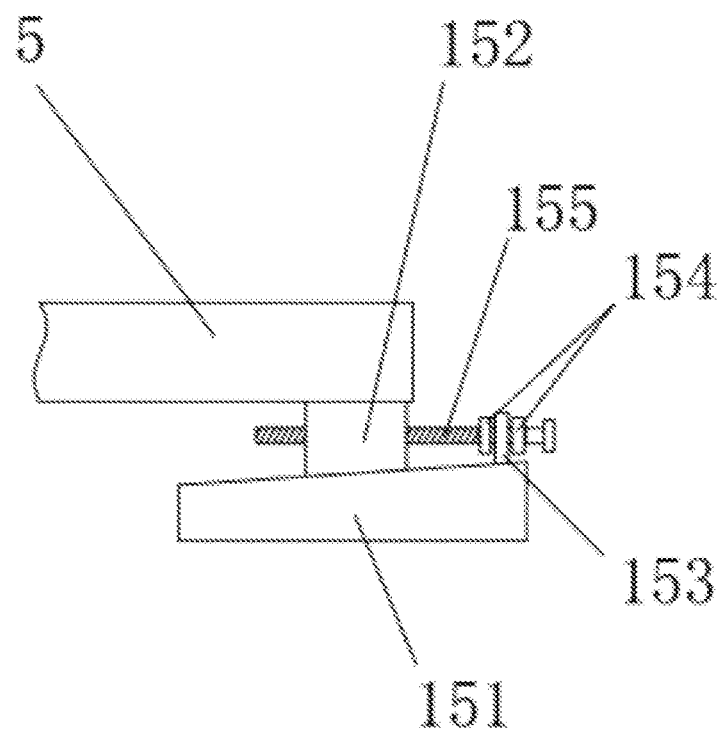
FIG. 8 is a schematic view showing a structure of a height adjust mechanism according to the present disclosure.
Figure 9:
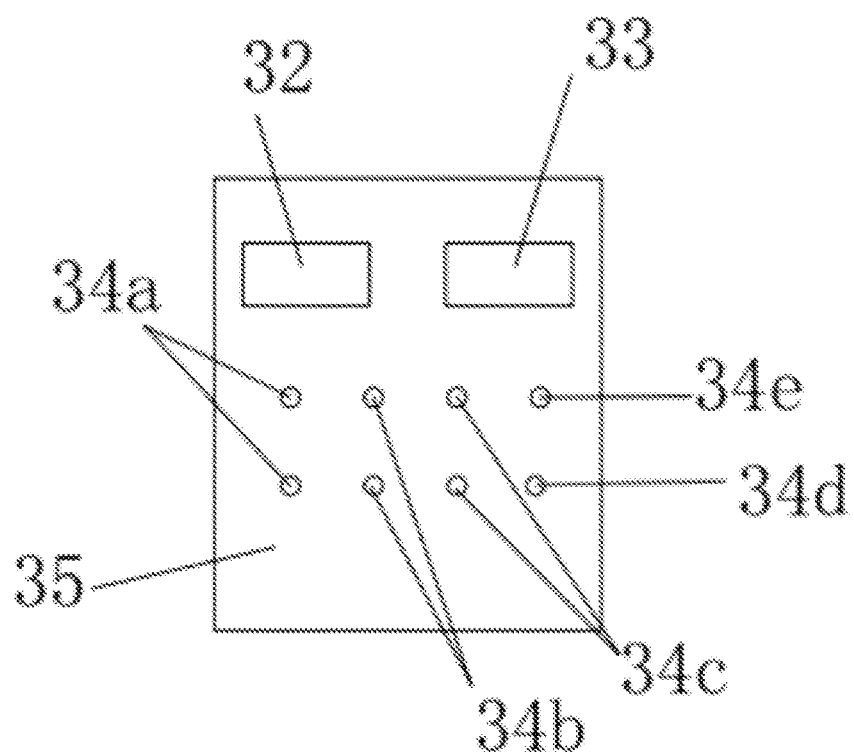
FIG. 9 is a schematic view showing a structure of a control box according to the present disclosure.
Figure 10:
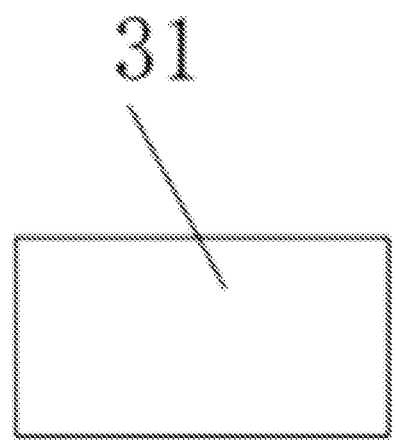
FIG. 10 is a schematic view showing a structure of a strain gauge according to the present disclosure.
Figure 11:
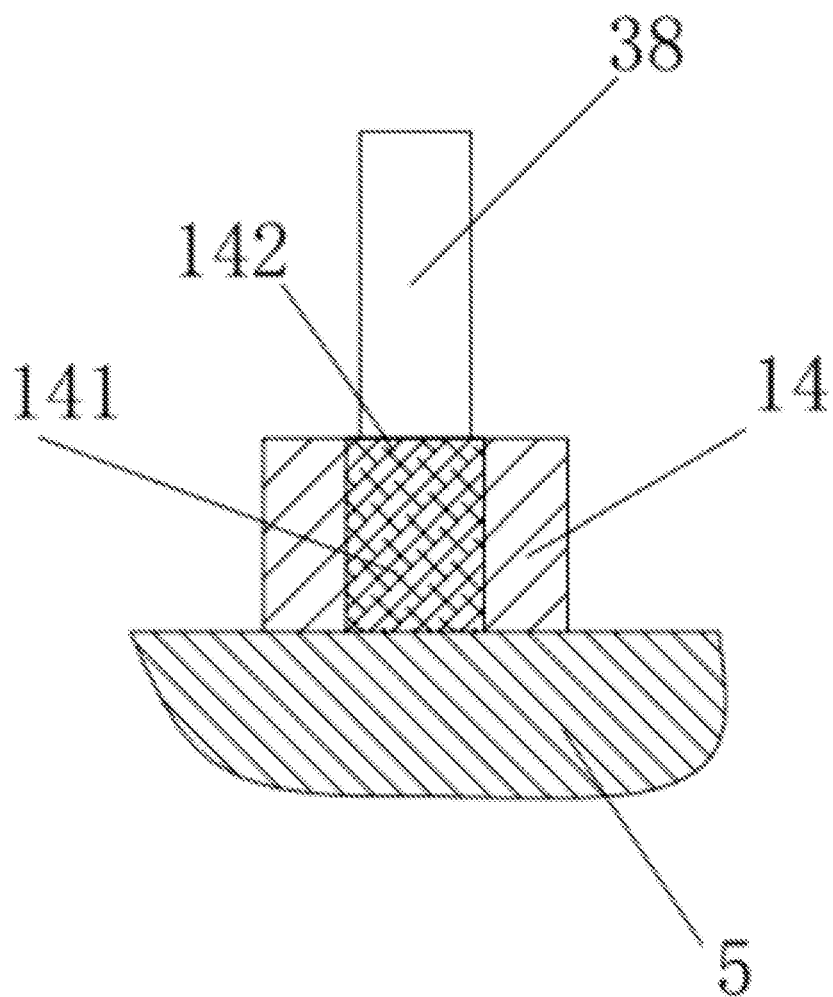
FIG. 11 is a cross-sectional view of a bumper pad according to the present disclosure.

Embodiments of the present disclosure will be described in further details with reference to the accompanying drawings.

As shown in FIGS. 1-13, the vertical Hopkinson pressure bar test device includes a guide cylinder 6, an incident bar 7, a transmission bar 8, a buffer bar 9 and a striker 2, and further includes a base 5, wherein side support plates 17 arranged vertically and upwards are provided symmetrically on two sides of the base 5; a horizontal first lateral support plate 30 is provided at the top between the side support plates on the two sides, three groups of second horizontal lateral support plates 19 are provided below; the first lateral support plate 30 sequentially between the side support plates on the two sides, a mounting hole 30a for the guide cylinder penetrating through the first lateral support plate 30 is formed therein, an upper end of the guide cylinder 6 is fixedly connected with the mounting hole 30a for the guide cylinder, the guide cylinder 6 is of a circular tubular hollow structure connecting the top and bottom, a fixed pulley 22 is provided above the guide cylinder 6, a motor 1 is provided on the first lateral support plate 30, an electromagnetic clutch 3 cooperating with the motor 1 is provided on a rotating shaft of the motor 1, a wire coil 2 is sleeved around an outer periphery of the electromagnetic clutch 3, one end of a steel wire rope 4 is fixedly connected with the wire coil 2, but the other end passes around the fixed pulley 22 and then extends downwards into a cavity of the guide cylinder 6, and is fixedly connected with an upper end of the striker 21 in sliding connection with and along the guide cylinder 6, a portion of the steel wire rope extending into the cavity of the guide cylinder 6 is collinear with a center line of the guide cylinder 6, an observation hole 63 connecting the interior and exterior is provided on a side wall of a lower part of the guide cylinder 6, a laser velocimeter sensor 16 for measuring a falling velocity of the striker before striking an upper end face of the incident bar, is provided on the guide cylinder 6 above the observation hole 63, and the laser velocimeter sensor 16 is connected with a laser velocimeter 32 used for displaying a velocity measured by the laser velocimeter sensor, each group of the second lateral support plates are provided with a clamping mechanism, the clamping mechanisms of the three groups of second lateral support plates from top to bottom correspond to the incident bar 7, the transmission bar 8 and the buffer bar 9 one by one, respectively, the clamping mechanism of each group clamps the corresponding incident bar 7, the transmission bar 8 or the buffer bar 9, respectively; moreover, the incident bar 7, the transmission bar 8 and the buffer bar 9 are all arranged coaxially with the guide cylinder, and a first strain gauge pad 36a for measuring strain value of the incident bar 7 is pasted on a surface of the incident bar 7, and a second strain gauge pad 36b for measuring a strain value of the transmission bar 8 is pasted on a surface of the transmission bar 8. Two first strain gauge pads, as well as two second strain gauge pads, can be symmetrically pasted on two sides of a corresponding position to acquire strain values by a semi-bridge connection method.

In order to ensure the use effect, the clamping mechanism includes an electric push bar 10, a force sensor 11 and a clamping hoop; each group of the second lateral support plates is provided with a bar channel 202 penetrating therethrough vertically, either the incident bar 7, the transmission bar 8 or the buffer bar 9 corresponding to the clamping mechanism is positioned at the center of the bar channel 202 and are in clearance fit with the bar channel (i.e., a gap exists between the corresponding incident bar 7 or the transmission bar 8 or the buffer bar 9 and an inner wall of the bar channel to eliminate stress effect on the bars). The electric push bar 10 is positioned on one side of the bar channel 202 and a piston bar 101 of the electric push bar extends towards the bar channel 202, the clamping hoop includes a fixed half hoop 122 and a movable half hoop 121, the fixed half hoop 122 is fixed on the other side of the bar channel 202, and the movable half hoop 121 is fixed on an outer end of the piston bar 101 of the electric push bar 10 through a connecting bar 21, a force sensor 11 is provided between the connecting bar 21 and the piston bar 101, a first clamping groove is formed at one side, facing the bar channel of the movable half hoop 121 and a second clamping groove is formed at one side, facing the bar channel, of the fixed half hoop 122, a first friction sheet 131 covers a surface of the first clamping groove and a second friction sheet 132 covers a surface of the second clamping groove. The second friction sheet 132 is tightly attached to a surface of a corresponding incident bar, transmission bar or buffer bar, and the piston bar is telescopic, such that a clamping and adjusting structure is formed for the corresponding bar (the incident bar, the transmission bar or the buffer bar).

The fixed half hoop 122 is fixed on the second lateral support plate through a flange, and fixed and screwed onto the second lateral support plate through a fifth bolt 124.

The difference between the friction force generated by clamping the corresponding bar (the incident bar, the transmission bar or the buffer bar) by the clamping mechanism and the gravity of the corresponding bar is within ±5% of the gravity of the corresponding bar; the upper end of the incident bar 7 extends into the cavity of the guide cylinder from the lower opening of the guide cylinder, and the upper end surface of the incident bar is in the range of the observation hole, as shown in FIG. 1, the electric push bars corresponding to the three groups of clamping mechanisms from top to bottom are respectively a first electric push bar 10a, a second electric push bar 10b and a third electric push bar 10c, and the force sensors 11 are a first force sensor 11a, a second force sensor 11b, and a third force sensor 11c, respectively. Taking the incident bar as an example, the incident bar is attached to the second friction sheet tightly and extends towards the bar channel through the piston bar of the first electric push bar 10a. The movable half hoop 121 applies force to the incident bar, so the incident bar is clamped between the first friction sheet and the second friction sheet, and the difference between the friction force generated by the axial force on the incident bar and the gravity of the incident bar is within ±0.5% of the gravity of the incident bar; that is, the friction force generated between the friction sheet and the incident bar should be equivalent to the gravity of the incident bar, with an tolerant error within ±0.5%. That is the manner in which the transmission bar and the buffer bar are clamped.

The vertical Hopkinson pressure bar test device further includes a dynamometer 33 corresponding to the force sensor 11 for reading a load value of the force sensor, and an output end of the force sensor 11 is connected with an input end of the dynamometer 33. The force sensor 11 is connected with the dynamometer 33 through a signal line. The dynamometer can display an axial load of the piston bar; the force sensor and the dynamometer are commercially available products, such as the force sensor model XL1153-1t and a dynamometer model XL2116A manufactured and sold by Qinhuangdao Xieli Science&Technology Development Co., Ltd. The material of the friction sheet is known, so the friction coefficient is known, and the contact area of the friction sheet and the corresponding bar is also known, therefore, the frictional force generated by the clamping mechanism, clamping the corresponding bar can be converted through the axial force acquired by the force sensor; this conversion method is a conventional technique for a person skilled in the art.

The vertical Hopkinson pressure bar test device further includes a strain gauge 31 corresponding to the first strain gauge pad 36a and the second strain gauge pad 36b, that are used for reading strain values of the two strain gauge pads, the output ends of the first strain gauge pad 36a and the second strain gauge pad 36b are connected with the input end of the strain gauge 31. The first strain gauge pad 36a and the second strain gauge pad 36b are rectangular, a distance between a transverse center line of the first strain gauge pad 36a and the lower end face of the incident bar is more than 2 times the height of the striker, and a distance between a transverse center line of the second strain gauge pad 36b and the upper end face of the transmission bar 8 is more than 2 times the height of the striker. The height of the striker refers to the solid structure of a cylinder.

The strain gauges can acquire voltage values of the first strain gauge pad 36a and the second strain gauge pad 36b. The strain gauge pads are commercially available products, such as strain gauge pad model BX120-5AA sold by Beijing Yiyang Strain and Vibration Testing Technology Co., Ltd., also the high performance dynamic test analysis system model DH8302 manufactured and sold by Jiangsu Donghua Test Technology Co., Ltd. can be adopted as the strain gauge; when such model of analysis system is connected with a computer, curves such as strain curve, a stress curve, a strain rate curve, a strain-stress curve can be drawn according to three computation patterns including incident wave-reflected wave; incident wave-transmitted wave or incident wave-reflected wave-transmitted wave, and waveforms can be imported and exported.

In order to obtain incident waves, reflected waves and transmitted waves, the device needs to shield interference of electric signals; the method to address this includes: firstly, grounding the device and the high-performance dynamic test analysis system model DH8302; and secondly, packaging the first strain gauge pad and the second strain gauge pad with tin foil paper, wherein a cable connecting the first strain gauge pad, the second strain gauge pad and the high-performance dynamic test analysis system model DH8302 must be shielded cable.

The device further includes a control box 35 on which displays of the dynamometer 33 and the laser velocimeter 32 are provided. The control box is also provided with keys corresponding to the first electric push bar 10a, the second electric push bar 10b, the third electric push bar 10c, the motor 1 and the electromagnetic clutch 3; the control box is provided with a controller therein connected with the first electric push bar 10a, the second electric push bar 10b, the third electric push bar 10c, the electromagnetic clutch 3 and the keys, proximity switch 24 is provided at the upper end of the guide cylinder for detecting the position of the striker, and the controller is connected with an input end of the motor through the proximity switch 24.

The proximity switch is known in the prior art, when the striker rises to a preset position, the proximity switch is switched off, the motor is thus powered off, and the striker stops rising, when the striker needs to be released, the electromagnetic clutch is operates to release the rotating shaft of the motor, thus the steel wire rope loses tension, and the striker falls freely in the guide cylinder, so that the rising position and the falling time of each striker are controlled. The proximity switch can be a commercially available conventional moving part position sensing elements, such as a displacement sensor and a photoelectric switch.

The keys include a first operation key 34a corresponding to the first electric push bar 10a, a second operation key 34b corresponding to the second electric push bar 10b, a third operation key 34c corresponding to the third electric push bar 10c, a fourth key 34d corresponding to the motor 1, and a fifth key 34e corresponding to the electromagnetic clutch. The electric push bar is a servo motor type or a stepping motor type, and the motor is a stepping motor to realize accurate control. The key can control the forward and reverse rotations of the electric push bar motor and the forward and reverse rotations of the motor.

The laser velocimeter 33 is a commercially available product, capable of measuring a velocity of a moving object by a laser probe of the laser velocimeter sensor and displaying the velocity and time on the display of the laser velocimeter. For example, the velocimeter model LK14T07B, which is sold by Beijing Tianhe Hengtong Science & Technology Development Co., Ltd., can be adopted, and parameters of such a velocimeter are as follows: time accuracy: 1 us; time test range: 1 us~999999 us; velocity measurement range: <999 m/s; velocity measurement distance: 50 mm; parallel tests of three paths of data, measured values displayed on the large liquid crystal screen: simultaneous display of velocity and time, the velocimeter is powered by: AC220V and working temperature: −10~40° C., the velocimeter includes a velocimeter body having a display and three groups of laser emitting and receiving probes; each laser emitting probe and each laser receiving probe correspond to each other one-to-one and are respectively and uniformly arranged above the observation hole, one group of laser emitting and receiving probes at the lowest part is distanced from the center of the observation hole by 50 mm, and a distance between adjacent laser emitting and receiving probes is 50 mm, which fully satisfies the requirements of the device.

After the pressing force between the electromagnetic clutch 3 and the rotating shaft 1a of the motor 1 is released, the steel wire rope is loosened, when the striker falls down to a lower limit position along an axial direction of the guide cylinder, the lower end face of the striker is lower than a lower edge of the observation hole of the guide cylinder or flush with the lower edge of the observation hole of the guide cylinder, thus ensuring that the striker can strike the upper end face of the incident bar.

The striker is of a solid cylindrical structure, an outer diameter of the cylindrical structure is smaller than an inner diameter of the guide cylinder 6, thus the striker can be ensured to slide up and down along the axial direction of the cavity of the guide cylinder under the action of gravity or pulling force of the steel wire rope; the striker includes a cylindrical striker body 211, and a center of an upper end face of the striker body 211 is provided with a blind-hole type bolt connecting hole, a joint 212 is screwed in the bolt connecting hole, and a lower end face of the joint 212 is provided with a upwards concave arc recess 215, a threading hole 216 connecting the top and bottom is formed in the center of the joint 212, and the steel wire rope 4 passes through the threading hole 216 and then into the arc recess 215, a guide block 213 for the steel wire rope and a limiting block 214 for the steel wire rope are sequentially provided at the end extending into the recess 215 from top to bottom. An upper end surface of the guide block 213 for the steel wire rope is in an arc surface shape matching with the surface of the arc recess 215, and the guide block 213 for the steel wire rope is in sliding connection with the steel wire rope.

A boss 211 is provided, on which a through hole 212 for connection with a wire rope is provided. A blind hole corresponding to the boss is formed in the upper end face of the striker; the boss 211 is screwed in and in threaded connection with the blind hole, an upper end of the boss 211 extends out of the blind hole, and the through hole 212 is formed in the boss at the portion extending out of the blind hole.

The first lateral support plate 30 is fixedly provided with a first connecting plate 26 covering the upper surface of the first lateral support plate through a first bolt 27; the first connecting plate 26 is provided with a mounting-hole-extension hole penetrating through the first connecting plate 26, which is coaxial with the mounting hole for the guide cylinder and has an equal diameter to the mounting hole for the guide cylinder; the mounting hole for the guide cylinder and the mounting-hole-extension hole are spliced together to form a connecting port of the guide cylinder, and the upper end of the guide cylinder is in threaded connection with the connecting port; the side wall of the upper part of the guide cylinder can be provided with a limiting block 6a for limiting the upward screwed position of the guide cylinder.

The fixed pulley 22 is rotatably connected to pulley supports 23 on the two sides of the mounting hole for the guide cylinder, and a baffle 28 positioned right above the fixed pulley 22 is connected between the pulley supports 23 on the two sides. The baffle 28 is fixed to the pulley supports 23 through a second bolt 29, and the pulley support 23 is fixed to the first lateral support plate 30 through a third bolt 25, a clearance between the baffle and the pulley is small, for example, 0.5-1 mm, in order to prevent the steel wire rope from falling off the fixed pulley when the striker falls down and strikes and then bounces back.

Multiple observation holes 63 are uniformly arranged on the peripheral wall of the lower part of the guide cylinder 6 at the same height, so that the positions of the striker and the incident bar can be conveniently checked from all directions.

Multiple groups of vent holes 61 are uniformly arranged on the side wall above the observation hole 63 along the height direction, two of the vent holes at two ends of the same diameter and of the same cross section form one group, and a striker unloading port 62 is arranged above the uppermost vent hole. The function of the vent hole is to vent air between the striker and the guide cylinder from the vent hole during the falling of the striker, thereby reducing the air resistance. When the striker needs to be unloaded, the striker is lifted; a pin is inserted into a group of selected vent holes at an appropriate height, so that the striker lands on the pin, and the boss at the upper end of the striker is located in the range of the unloading port 62 for the striker; a spanner reaches into the unloading port for the striker to unscrew the boss, then the pin is pulled out, and the striker is taken out from the lower opening of the guide cylinder. Similarly, the process of loading a new striker is conducted by reversing the above steps.

Four corners of the base 5 are respectively provided with a height adjusting mechanism, the height adjusting mechanism includes a base plate 151, a sliding support block 152 and an adjusting screw 155, wherein the sliding support block 152 is fixed on the lower surface of the base; the lower surface of the base plate 151 is a horizontal plane, the upper surface of the base plate 151 is an inclined plane, the lower surface of the sliding support block 152 is an inclined plane matched with the lower surface of the base plate; the lower surface of the sliding support block 152 is disposed on the upper surface of the base plate 151; the outer side of the base plate extends beyond the outer side of the base, an upward protruding screw fixing plate 153 is provided on the surface of the extension beyond the outer side of the base, the adjusting screw 155 is horizontally and rotatably connected with the screw fixing plate 153, one end of the adjusting screw 155 is in threaded connection with the sliding support block 152, and screw limiting blocks 154 are respectively provided on two sides of the screw fixing plate. The screw limiting block 154 functions to limit the adjusting screw 155 from sliding back and forth relative to the screw fixing plate, and the adjusting screw is rotated to drive the sliding support block 152 to slide outwards and upwards or inwards and downwards along the inclined plane of the upper surface of the base plate, thereby forming a horizontal adjusting structure of the base. In actual operation, whether the upper surface of the base is horizontal or not is rechecked by a level ruler, and if not, the base is adjusted by the height adjusting mechanism until the upper surface of the base is horizontal.

An inner side surface of each of the side support plates 17 is provided with a first rail 171 vertically; first slider 18 corresponding to the first rail 171 are provided at two sides of the first lateral support plate 30 and the second lateral support plate 19, respectively; the first slider 18 is provided with a third bolt 181 for fixing the position of the first slider on the first rail, thereby forming the height adjusting structure for the first lateral support plate and second lateral support plate. Levels of the first and second lateral support plates are rechecked by the level ruler until the first and second lateral support plates are horizontal.

The second lateral support plate 19 is provided with a second rail 191 arranged in parallel with an axial direction of the piston bar of the electric push bar; the second rail 191 is provided with a sliding plate 20 which slides leftwards and rightwards along a length direction thereof, the sliding plate is provided with a fourth bolt 201 for fixing the position thereof, the clamping mechanism is disposed on the sliding plate, and the sliding plate is provided with a through hole corresponding to the bar channel 202.

The electric push bar 10 is disposed on one side of the through hole, the piston bar 101 of the electric push bar extends towards the through hole, the clamping hoop includes a fixed half hoop 122 and a movable half hoop 121, the fixed half hoop 122 is fixed on the other side of the through hole, the movable half hoop 121 is fixed on an outer end of the piston bar 101 of the electric push bar 10 through a connecting bar 21, a force sensor 11 is provided between the connecting bar 21 and the piston bar 101, a first clamping groove is formed at one side of the movable half hoop 121 facing the through hole, a second clamping groove is formed at one side of the fixed half hoop 122 facing the through hole, the first friction sheet 131 covers the surface of the first clamping groove, and the second friction sheet 132 covers the surface of the second clamping groove; during actual operation, the sliding plate is adjusted leftwards and rightwards, so that the through hole is coaxial with the bar channel, the incident bar 7, the transmission bar 8 or the buffer bar 9 corresponding to the clamping mechanism are positioned in the center of the coaxial hole, the second friction sheet 132 is tightly attached to a surface of the corresponding incident bar, transmission bar or buffer bar, and the piston bar is telescopic, so that the clamping and adjusting structure is formed for the corresponding bar (the incident bar, the transmission bar or the buffer bar).

Figure 12:
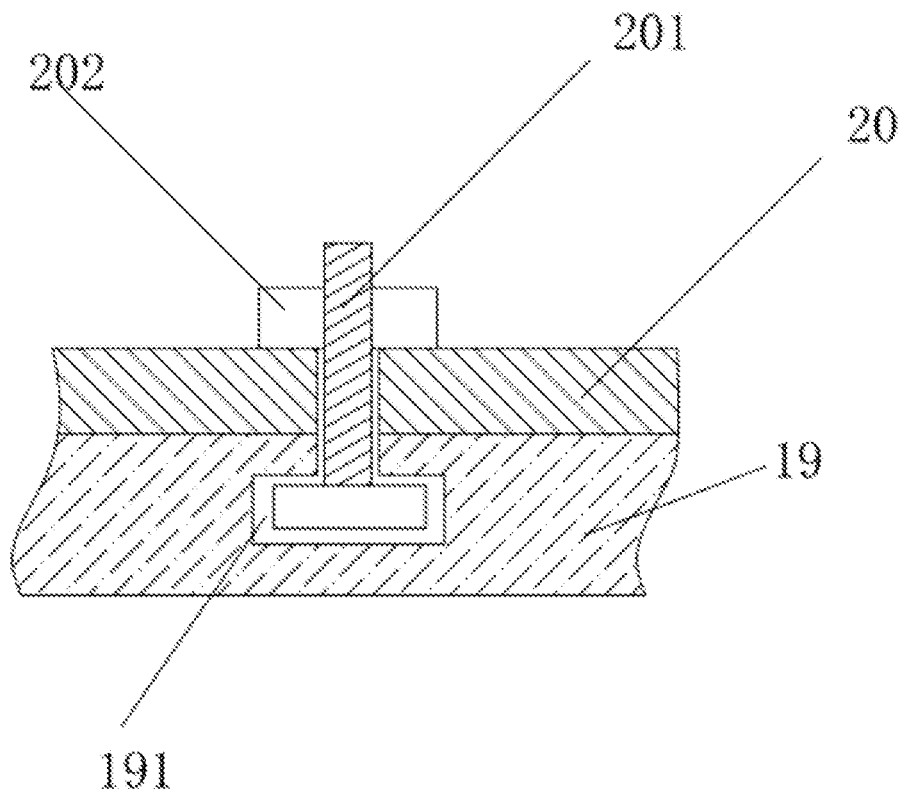
FIG. 12 is a schematic view showing a structure of a second rail according to the present disclosure.
Figure 13:
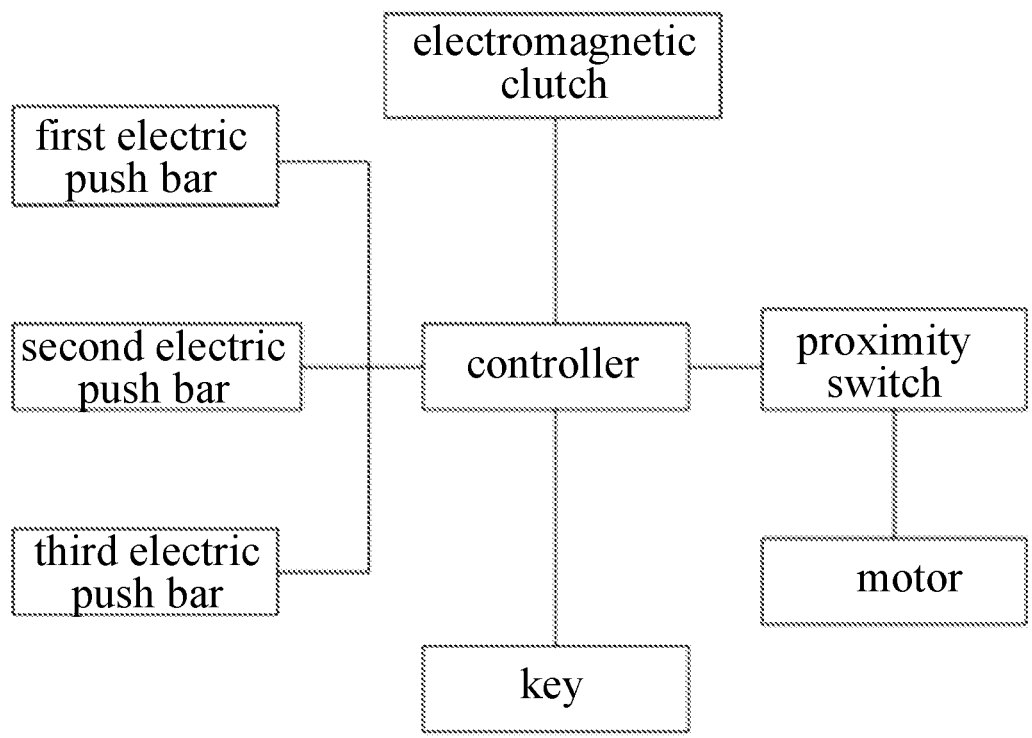
FIG. 13 is a schematic block diagram of a circuit principle according to the present disclosure.

A schematic diagram of the first rail and the second rail is shown in FIG. 12, taking the second rail as an example, the second rail is in an inverted T shape, the head of the fourth bolt 201 is clamped in the second rail, the screw of the bolt 201 penetrates through the sliding plate 20 and extends upwards, a fastening nut 202 is provided at the extension of the bolt 201, and after the fastening nut is loosened, the fourth bolt can slide along the second rail and simultaneously drive the sliding plate to slide, and the fastening nut is screwed up again when the fourth bolt is in place. The situation is similar for the first rail, and other conventional forms may be alternative.

A buffer pad 14 facing to the buffer bar is provided on the base 5, a buffer hole 142 is formed in the center of the buffer pad, a buffer body 141 made of rubber or silica gel is filled in the buffer hole 142, a jack 38 can also be placed on the buffer body 141, that serves as protection when the buffer bar is struck down.

The jack facilitates loading and unloading the specimen, and the operation process includes: releasing the jack oil pressure by releasing the second push bar motor and the third push bar motor to lower the transmission bar and the buffer bar to take out the specimen; a method of loading the specimen includes: releasing the first push bar motor to enable the incident bar to be in contact with the transmission bar, lifting the jack to enable the upper end face of the incident bar to be positioned in the range of the observation hole at the lower part of the guide cylinder and to be in contact with the lower end face of the striker, starting the first push bar motor, pressing and fixing the incident bar, releasing the jack oil pressure to enable the transmission bar and the buffer bar to descend, lifting the jack to enable the specimen to be in contact with the incident bar and the transmission bar after placing the specimen, starting the second push bar motor, and pressing and fixing the transmission bar; starting the third push bar motor, and pressing and fixing the buffer bar.

Figure 14:
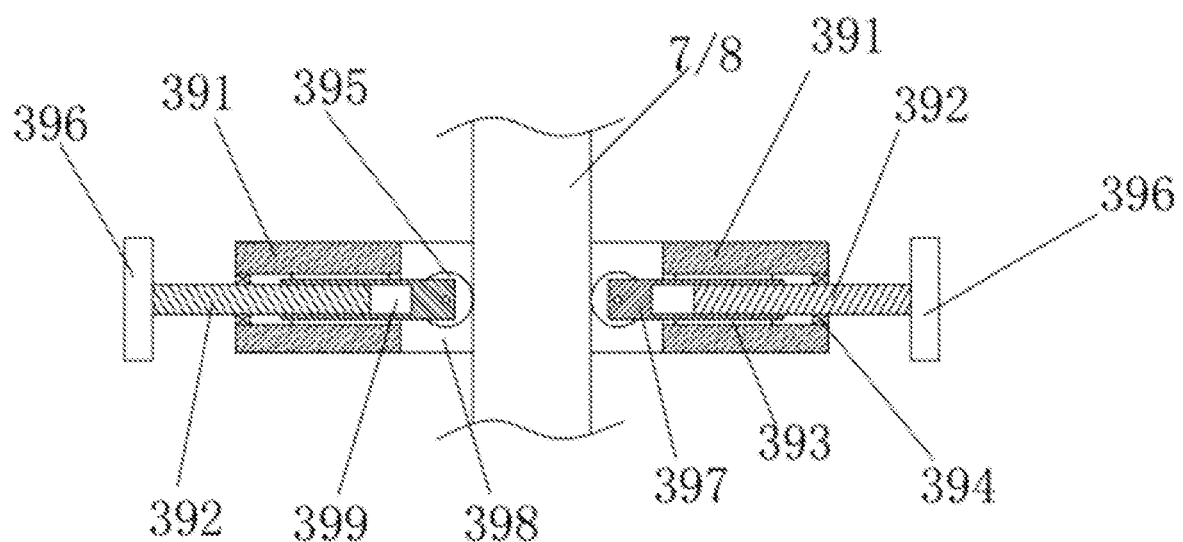
FIG. 14 is a schematic cross-sectional view of a center bracket according to the present disclosure.

A plurality of groups of center brackets 39 for centering and guiding the guide cylinder, the incident bar, the transmission bar and the buffer bar can be further provided on the support plate, the center bracket 39 is known in the prior art and functions to enable the incident bar and the transmission bar to pass through the center thereof and keep in the axial direction, rendering a more stable fall. An embodiment of the center bracket is shown in FIG. 14; the center bracket includes an annular guide seat 391, that is provided with a plurality of telescopic columns 397 along a circumference thereof horizontally at equal intervals, the telescopic column 397 slides along a radial direction of the guide seat 391, a rail and a slider 393 that are matched with one another are provided between the telescopic column 397 and the guide seat 391, one end of the telescopic column 397 extends into a center hole 398 of the guide seat 391 and is rotatably connected with a roller 395 for the incident bar and the transmission bar to slide and pass through, one end, distal to the roller, of the telescopic column 397 is provided with a blind-hole type threaded hole 399, a adjusting screw 392 is screwed in the threaded hole and extends beyond the outer side of the guide seat, a limiting bearing 394 used for limiting the radial position of the adjusting screw is provided between the adjusting screw 392 and the guide seat, a pilot wheel is provided at one end, extending beyond the outer side of the guide seat, of the adjusting screw, the guide seat can be directly fixed on a support plate on one side and can also be adjusted up and down by configurating the first slider 18 corresponding to the first rail 171, and the mechanism is as described above. As such, when the adjusting screw is rotated, due to the limiting bearing limiting the radial position of the adjusting screw, the telescopic column slides back and forth along the radial direction of the guide seat during rotation of the adjusting screw; and due to the rail and the slider 393, the telescopic column only slides back and forth and cannot rotate, so the roller keeps the orientation thereof unchanged and is always attached to the surfaces of the guide cylinder, the incident bar, the transmission bar and the buffer bar, thereby playing a guiding role in the sliding process; one group of center brackets 39 can be provided on the guide cylinder, and two groups of center brackets 39 can be respectively provided on the incident bars, the transmission bars and the buffer bars.

In the foregoing description, it is to be understood that terms "center", "longitudinal", "lateral", "radial", "length", "width", "thickness", "upper", "lower", "front", "rear", "left", "right", "vertical", "horizontal", "top", "bottom", "inner", "outer", "clockwise", "counterclockwise" and the like are used for facilitating description of the disclosure, and the orientation and positional relationship indicated by these terms refer to the orientation or positional relationship shown in the drawings.

A method is provided for measuring stress strain of low-wave impedance materials based on the vertical Hopkinson pressure bar test device according to the disclosure, comprising the steps of:

I. calibrating a) sliding the incident bar up and down along the bar channel which corresponds to the incident bar and is provided on the second lateral support plate, to make the upper end face of the incident bar to be in the range of the observation hole at the lower part of the guide cylinder and in contact with the lower end face of the striker; starting the first push bar motor, and pressing and fixing the incident bar;

b) sliding the transmission bar up and down along a bar channel which corresponds to the transmission bar and is provided on the second lateral support plate, to make the upper end face of the transmission bar to be tightly attached to a lower end face of the incident bar; starting a second push bar motor, and pressing and fixing the transmission bar;

c) sliding the buffer bar up and down along the bar channel which corresponds to the buffer bar and is provided in the second lateral support plate, to make the upper end face of the buffer bar to be tightly attached to the lower end face of the transmission bar; starting the third push bar motor, and pressing and fixing the buffer bar;

d) adjusting forward or reverse rotation of the first push bar motor, the second push bar motor and the third push bar motor and observing a display of the dynamometer 33, so that the difference between the friction force generated by clamping the corresponding bar by each clamping mechanism and the gravity of the corresponding bar is within ±0.5% of the gravity of the corresponding bar; wherein the gravity of the incident bar, the transmission bar or the buffer bar is a known quantity because it can be measured in advance; the material of the friction sheet is known, i.e., the friction coefficient is known, and the contact area between the friction sheet and the corresponding bar is also known; therefore, the friction force generated by the clamping mechanism clamping the corresponding bar can be converted from the axial force acquired by the force sensor. The conversion method is a conventional technique to a person skilled in the art; the friction force can be calculated in advance and displayed directly by a dynamometer, and this is also a conventional technique to a person skilled in the art;

e) starting the electromagnetic clutch to clamp the rotating shaft of the motor tightly, starting the motor, and driving the striker to slide upwards to a specified position along the cavity of the guide cylinder by the steel wire rope; adjusting center brackets of the guide cylinder, the incident bar, the transmission bar and the buffer bar to enable the striker, the incident bar, the transmission bar and the buffer bar to be aligned;

f) releasing the electromagnetic clutch to release the rotating shaft of the motor, so that the steel wire rope loses a pulling force and the striker freely falls in the guide cylinder to strike the incident bar, acquiring a velocity V0 of the striker when contacting the incident bar by the laser velocimeter via the laser velocimeter sensor, and measuring a voltage peak Vi0 output by the first strain gauge pad attached to the incident bar and a voltage peak Vt0 output by the second strain gauge pad attached to the transmission bar, through the first strain gauge pad, the second strain gauge pad and a strain gauge; (Vi0 is the peak voltage of the incident wave of the incident bar, and Vt0 is the peak voltage of the transmitted wave of the transmission bar);

g) amending the voltage and a strain conversion coefficient calculating voltages and strain conversion coefficients $\eta i$ and $\eta t$ of the incident bar and the transmission bar according to a formula $$\eta = \frac{\varepsilon}{V} = \frac{V_0}{2C_0} \frac{1}{V};$$

wherein V0 is the velocity of the striker when contacting the incident bar;

C0 is a propagation velocity of a strain wave in a bar (known quantity);

V is voltage peaks Vi0 and Vt0 output by the resistance strain gauge pads attached to the incident bar and the transmission bar, respectively;

II. testing a) sliding the incident bar up and down along the bar channel, which corresponds to the incident bar, is provided on the second lateral support plate, to make the upper end face of the incident bar to be in the range of the observation hole at the lower part of the guide cylinder and in contact with the lower end face of the striker, starting the first push bar motor, and pressing and fixing the incident bar;

b) sliding the transmission bar downwards along the bar channel, which corresponds to the transmission bar, is provided on the second lateral support plate, placing a specimen 37 on the upper end face of the transmission bar, sliding the transmission bar upwards, enabling an upper end face of the specimen 37 to attach to the lower end face of the incident bar tightly, starting the second push bar motor, and pressing and fixing the transmission bar (the two sides of the specimen can be smeared with grease couplant);

c) sliding the buffer bar up and down along the bar channel, which corresponds to the buffer Bar, is provided on the second lateral support plate, to make the upper end face of the buffer bar to be tightly attached to the lower end face of the transmission bar; starting the third push bar motor, and pressing and fixing the buffer bar;

d) adjusting forward rotation or reverse rotation of the first push bar motor, the second push bar motor and the third push bar motor and observing the display of the dynamometer 33, so that the difference between the friction force generated by clamping the corresponding bar by each clamping mechanism and the gravity of the corresponding bar is within ±0.5% of the gravity of the corresponding bar;

e) starting the electromagnetic clutch to clamp the rotating shaft of the motor tightly, starting the motor, and driving the striker to slide upwards to a specified position along the cavity of the guide cylinder by the steel wire rope; adjusting the center brackets of the guide cylinder, the incident bar, the transmission bar and the buffer bar to enable the striker, the incident bar, the transmission bar and the buffer bar to be aligned;

f) releasing the electromagnetic clutch to release the rotating shaft of the motor, so that the steel wire rope loses a pulling force and the striker freely falls in the guide cylinder to strike the incident bar; acquiring a velocity V0 of the striker when contacting the incident bar by the laser velocimeter via the laser velocimeter sensor, and measuring the voltage peaks Vi, Vr and Vt output by the strain gauge pads attached to the incident bar and the transmission bar respectively through the first strain gauge pad, the second strain gauge pad and the strain gauge; wherein Vi is a voltage peak of the incident wave of the incident bar output by the first strain gauge pad, Vr is a voltage peak of a reflected wave of the incident bar output by the first strain gauge pad, and Vt is a voltage peak of a transmitted wave of the transmission bar output by the second strain gauge pad;

III. data processing converting the measured voltage peak Vi of the incident bar to an incident wave strain εi according to the formula εi=ηi×Vi;

converting the measured voltage peak Vr of the transmission bar into an incident wave strain εr according to the formula εr=ηi×Vr, and converting the measured Vt of the transmission bar into an incident wave strain εt according to the formula εt=ηt×Vt; and obtaining a stress strain of the specimen under the action of dynamic load according to the formula:

$$\sigma_S = EA\varepsilon_t/A_S\varepsilon = \frac{2C_0}{L_0} \times \int_0^1 \varepsilon_r d_t,$$

to understand the dynamic constitutive relation of the material (wherein E is the elastic modulus (incident bar) of the pressure bar material, A is the cross-sectional area of the pressure bar, C0 is the propagation velocity of the strain wave in the bar, and Ls is the length of the specimen).

The specimen 37 is a cylindrical specimen made of low-wave impedance materials such as coal and lightweight concrete.

As is apparent from the above, the present disclosure has the following advantages:

1. with impact generated under the gravity of the striker falling freely, the striking velocity of the striker is controlled to render a medium or low velocity of the striker for analyzing the dynamic mechanical properties of low-wave impedance materials such as coal and light concrete;

2. the incident bar, the transmission bar or the buffer bar is clamped by the clamping mechanism, meanwhile, the stress condition of the corresponding bar is acquired by the force sensor, and the load is adjusted by the push bar motor, so that the difference between the friction force and the gravity of the corresponding bar is in an error range; the requirements of experiments are met, and the adjustment operation is very flexible;

3. the height of the first and second lateral support plates can be adjusted, so that the lengths of the striker, the guide cylinder, the incident bar and the transmission bar can be correspondingly changed to meet the requirements of dynamic tests at high, medium and low velocities; the striking velocity of the striker is accurately controlled to render high, medium and low striking velocities, without pneumatic loading and electromagnetic emission, featuring reduced loss of energy and environmental protection;

4. the baffle is additionally provided on the pulley supports of the fixed pulley, so that the steel wire rope is well prevented from falling off the fixed pulley when the striker falls down and strikes, and then bounces back;

5. the observation holes are formed in the lower part of the guide cylinder, so that the positions of the striker and the incident bar are rechecked, thus the striker can be ensured to strike the incident bar at a specified position accurately; and 6. the vent holes are additionally provided at the lower part of the guide cylinder, so that the influence of air resistance on the test is well reduced and the test precision is greatly improved; moreover, the vent holes serve as the fixing hole for the pin, thus the striker can land on the pin and be replaced through the striker unloading port, thereby meeting the test requirements of different parameters.

What is claimed:

1. A vertical Hopkinson pressure bar test device, comprising a guide cylinder (6), an incident bar (7), a transmission bar (8), a buffer bar (9) and a striker (21), and further comprising a base (5), wherein side support plates (17) arranged vertically and upwards are provided symmetrically on two sides of the base (5), a horizontal first lateral support plate (30) is provided at a top between the side support plates on the two sides, three groups of horizontal second lateral support plates (19) are provided below the first lateral support plate (30) sequentially between the side support plates on the two sides; a mounting hole (30a) for the guide cylinder penetrating through the first lateral support plate (30) is formed therein, an upper end of the guide cylinder (6) is fixedly connected with the mounting hole (30a) for guide cylinder, the guide cylinder (6) is of a circular tubular hollow structure communicating the top and bottom, a fixed pulley (22) is provided above the guide cylinder (6); a motor (1) is provided on the first lateral support plate (30), an electromagnetic clutch (3) cooperating with the motor (1) is provided on a rotating shaft of the motor (1), a wire coil (2) is sleeved around an outer periphery of the electromagnetic clutch (3); one end of a steel wire rope (4) is fixedly connected with the wire coil (2), the other end passes around the fixed pulley (22) and then extends downwards into a cavity of the guide cylinder (6) and is fixedly connected with an upper end of the striker (21) in sliding connection with and along the guide cylinder (6); a portion of the steel wire rope extending into the cavity of the guide cylinder (6) is collinear with a center line of the guide cylinder (6); an observation hole (63) communicating an interior and exterior is provided on a side wall of a lower part of the guide cylinder (6), a laser velocimeter sensor (16) for measuring a falling velocity of the striker before striking an upper end face of the incident bar, is provided on the guide cylinder (6) above the observation hole (63), and the laser velocimeter sensor (16) is connected with a laser velocimeter (32) used for displaying a velocity measured by the laser velocimeter sensor (16); each group of the second lateral support plates is provided with a clamping mechanism, the clamping mechanisms of the three groups of second lateral support plates from top to bottom correspond to the incident bar (7), the transmission bar (8) and the buffer bar (9) one by one; the clamping mechanism of each group clamps the corresponding incident bar (7), the transmission bar (8) or the buffer bar (9); moreover, the incident bar (7), the transmission bar (8) and the buffer bar (9) are all arranged coaxially with the guide cylinder, a first strain gauge pad (36a) for measuring a strain value of the incident bar (7) is pasted on a surface of the incident bar (7), and a second strain gauge pad (36b) for measuring a strain value of the transmission bar (8) is pasted on a surface of the transmission bar (8).

2. The vertical Hopkinson pressure bar test device according to claim 1, wherein the clamping mechanism comprises an electric push bar (10), a force sensor (11) and a clamping hoop; each group of the second lateral support plates is provided with a bar channel (202) penetrating therethrough vertically, and the incident bar (7), the transmission bar (8) or the buffer bar (9) corresponding to the clamping mechanism is positioned at a center of the bar channel (202) and is in clearance fit with the bar channel; the electric push bar (10) is positioned on one side of the bar channel (202), a piston bar (101) of the electric push bar extends towards the bar channel (202); the clamping hoop includes a fixed half hoop (122) and a movable half hoop (121), the fixed half hoop (122) is fixed on the other side of the bar channel (202), the movable half hoop (121) is fixed on an outer end of the piston bar (101) of the electric push bar (10) through a connecting bar (21), a force sensor (11) is provided between the connecting bar (21) and the piston bar (101), a first clamping groove is formed at one side, facing the bar channel, of the movable half hoop (121), a second clamping groove is formed at one side, facing the bar channel, of the fixed half hoop (122), a first friction sheet (131) covers a surface of the first clamping groove, a second friction sheet (132) covers a surface of the second clamping groove, the second friction sheet (132) is tightly attached to a surface of a corresponding incident bar, transmission bar or buffer bar, and the piston bar is telescopic, so that a clamping and adjusting structure is formed for the corresponding bar; the fixed half hoop (122) is fixed on the second lateral support plate through a flange, and fixed and screwed onto the second lateral support plate through a fifth bolt (124).

3. The vertical Hopkinson pressure bar test device according to claim 2, wherein a difference between the friction force generated by clamping the corresponding bar by the clamping mechanism and the gravity of the corresponding bar is within a range of five percent of the gravity of the corresponding bar, the upper end of the incident bar extends into the cavity of the guide cylinder from the lower opening of the guide cylinder, and the upper end surface of the incident bar is in the range of the observation hole the electric push bars corresponding to the three groups of clamping mechanisms from top to bottom are respectively a first electric push bar, a second electric push bar and a third electric push bar, and the force sensors include a first force sensor, a second force sensor, and a third force sensor.

4. The vertical Hopkinson pressure bar test device according to claim 2, further comprising a dynamometer corresponding to the force sensor for reading a load value of the force sensor, wherein, an output end of the force sensor is connected with an input end of the dynamometer.

5. The vertical Hopkinson pressure bar test device according to claim 2, further comprising a strain gauge corresponding to the first strain gauge pad and the second strain gauge pad and used for reading strain values of the two strain gauge pads, and the output ends of the first strain gauge pad and the second strain gauge pad are connected with an input end of the strain gauge; a distance between a transverse center line of the first strain gauge pad and the lower end face of the incident bar is more than two times the height of the striker, and a distance between a transverse center line of the second strain gauge pad and the upper end face of the transmission bar is more than two times the height of the striker.

6. The vertical Hopkinson pressure bar test device according to claim 5, further comprising a control box, where displays of the dynamometer and the laser velocimeter are provided; the control box is also provided with keys corresponding to the first electric push bar, the second electric push bar, the third electric push bar, the motor and the electromagnetic clutch, respectively; moreover, the control box is provided with a controller therein connected with the first electric push bar, the second electric push bar, the third electric push bar, the electromagnetic clutch and the keys; a proximity switch is provided at the upper end of the guide cylinder for detecting the position of the striker, and the controller is connected with an input end of the motor through the proximity switch;

the keys include a first operation key corresponding to the first electric push bar, a second operation key corresponding to the second electric push bar, a third operation key corresponding to the third electric push bar, a fourth key corresponding to the motor, and a fifth key corresponding to the electromagnetic clutch.

7. A method for measuring stress-strain relationship of low-wave impedance materials based on the vertical Hopkinson pressure bar test device according to claim 6, comprising the steps of:

calibrating comprising:

sliding the incident bar up and down along the bar channel which corresponds to the incident bar and is provided on the second lateral support plate, to make the upper end face of the incident bar to be in the range of the observation hole at the lower part of the guide cylinder and in contact with the lower end face of the striker; starting the first push bar motor, and pressing and fixing the incident bar;

sliding the transmission bar up and down along a bar channel which corresponds to the transmission bar and is provided on the second lateral support plate, to make an upper end face of the transmission bar to be tightly attached to a lower end face of the incident bar; starting a second push bar motor, and pressing and fixing the transmission bar;

sliding the buffer bar up and down along the bar channel which corresponds to the buffer bar and is provided on the second lateral support plate, to make the upper end face of the buffer bar to be tightly attached to the lower end face of the transmission bar; starting the third push bar motor, and pressing and fixing the buffer bar;

adjusting forward rotation or reverse rotation of the first push bar motor, the second push bar motor and the third push bar motor and observing the display of the dynamometer, so that the difference between the friction force generated by clamping the corresponding bar by each clamping mechanism and the gravity of the corresponding bar is within a range of 0.5% of the gravity of the corresponding bar;

starting the electromagnetic clutch to clamp the rotating shaft of the motor tightly, starting the motor, and driving the striker to slide upwards to a specified position along the cavity of the guide cylinder by the steel wire rope;

releasing the electromagnetic clutch to release the rotating shaft of the motor, so that the steel wire rope loses a pulling force and the striker freely falls in the guide cylinder to strike the incident bar, acquiring a velocity $V_0$ of the striker when contacting the incident bar by the laser velocimeter via the laser velocimeter sensor, and measuring a voltage peak $V_i 0$ of an incident wave of the incident bar output by the first strain gauge pad attached to the incident bar, and a voltage peak $V_t 0$ of a transmitted wave of the transmission bar output by the second strain gauge pad attached to the transmission bar, through the first strain gauge pad, the second strain gauge pad and a strain gauge; and amending the voltage and a strain conversion coefficient calculating voltages and strain conversion coefficients $\eta i$ and $\eta t$ of the incident bar and the transmission bar according to the following formula $$\eta = \frac{\varepsilon}{V} = \frac{V_0}{2C_0}\frac{1}{V};$$

wherein $V_0$ is a velocity of the striker when contacting the incident bar; $C_0$ is a propagation velocity of a strain wave in a bar;

V is voltage peaks output by the resistance strain gauge pads attached to the incident bar and the transmission bar, being $V_i 0$ and $V_t 0$, respectively;

testing comprising sliding the incident bar up and down along the bar channel which corresponds to the incident bar and is provided on the second lateral support plate, to make the upper end face of the incident bar to be in the range of the observation hole at the lower part of the guide cylinder and in contact with the lower end face of the striker; starting the first push bar motor, and pressing and fixing the incident bar;

sliding the transmission bar downwards along the bar channel which corresponds to the transmission bar and is provided on the second lateral support plate, placing a specimen on the upper end face of the transmission bar, sliding the transmission bar upwards, enabling an upper end face of the specimen to attach to the lower end face of the incident bar tightly, starting the second push bar motor, and pressing and fixing the transmission bar;

sliding the buffer bar up and down along the bar channel which corresponds to the buffer bar and is provided on the second lateral support plate, to make the upper end face of the buffer bar to be tightly attached to the lower end face of the transmission bar; starting the third push bar motor, and pressing and fixing the buffer bar;

adjusting forward rotation or reverse rotation of the first push bar motor, the second push bar motor and the third push bar motor and observing the display of the dynamometer, so that the difference between the friction force generated by clamping the corresponding bar by each clamping mechanism and the gravity of the corresponding bar is within a range of 0.5% of the gravity of the corresponding bar;

starting the electromagnetic clutch to clamp the rotating shaft of the motor tightly, starting the motor, and driving the striker to slide upwards to a specified position along the cavity of the guide cylinder by the steel wire rope;

releasing the electromagnetic clutch to release the rotating shaft of the motor, so that the steel wire rope loses a pulling force and the striker freely falls in the guide cylinder to strike the incident bar, acquiring a velocity $V_0$ of the striker when contacting the incident bar by the laser velocimeter via the laser velocimeter sensor, and measuring the voltage peaks $V_i$, $V_r$ and $V_t$ output by the strain gauge pads attached to the incident bar and the transmission bar respectively through the first strain gauge pad, the second strain gauge pad and the strain gauge; wherein $V_i$ is a voltage peak of the incident wave of the incident bar output by the first strain gauge pad, $V_r$ is a voltage peak of a reflected wave of the incident bar output by the first strain gauge pad, and $V_t$ is a voltage peak of a transmitted wave of the transmission bar output by the second strain gauge pad;

data processing comprising:

converting the measured voltage peak $V_i$ of the incident bar to an incident wave strain $\varepsilon_i$ according to the formula $\varepsilon_i = \eta_i \times V_i$;

converting the measured voltage peak $V_r$ of the transmission bar into an incident wave strain $\varepsilon_r$ according to the formula $\varepsilon_r = \eta_r \times V_r$, and converting the measured $V_t$ of the transmission bar into an incident wave strain $\varepsilon_t$ according to the formula $\varepsilon_t = \eta_t \times V_t$; and obtaining a stress strain of the specimen under the action of dynamic load according to the formula:

$$\sigma_S = EA\varepsilon_t/A_S\varepsilon = \frac{2C_0}{L_0} \times \int_0^1 \varepsilon_r dt,$$

to understand the dynamic constitutive relation of the material.

8. The vertical Hopkinson pressure bar test device according to claim 1, wherein after a pressing force between the electromagnetic clutch and the rotating shaft of the motor is released, the steel wire rope is loosened; when the striker falls down to a lower limit position along axial direction of the guide cylinder, the lower end face of the striker is lower than a lower edge of the observation hole of the guide cylinder or flush with the lower edge of the observation hole of the guide cylinder.

9. The vertical Hopkinson pressure bar test device according to claim 1, wherein the fixed pulley is rotatably connected to pulley supports on the two sides of the mounting hole for the guide cylinder, and a baffle positioned right above the fixed pulley is connected between the pulley supports on the two sides.

10. The vertical Hopkinson pressure bar test device according to claim 1, wherein multiple groups of vent holes (61) are uniformly arranged on the side wall above the observation hole (63) along a height direction, two of the vent holes at two ends of the same diameter of the same cross section form one group, and an unloading port (62) for the striker is arranged above an uppermost vent hole.

* * * * *